US011852028B2

(12) United States Patent
Maesato et al.

(10) Patent No.: US 11,852,028 B2
(45) Date of Patent: Dec. 26, 2023

(54) GAS TURBINE ENGINE

(71) Applicant: KAWASAKI JUKOGYO KABUSHIKI KAISHA, Kobe (JP)

(72) Inventors: Hikaru Maesato, Kobe (JP); Takafumi Fujii, Kobe (JP); Tatsuya Okuwa, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 17/799,319

(22) PCT Filed: Feb. 12, 2021

(86) PCT No.: PCT/JP2021/005256
§ 371 (c)(1),
(2) Date: Aug. 12, 2022

(87) PCT Pub. No.: WO2021/162091
PCT Pub. Date: Aug. 19, 2021

(65) Prior Publication Data
US 2023/0068146 A1 Mar. 2, 2023

(30) Foreign Application Priority Data

Feb. 14, 2020 (JP) ................. 2020-023236

(51) Int. Cl.
F01D 25/18 (2006.01)
F01D 25/16 (2006.01)
(52) U.S. Cl.
CPC ............. F01D 25/18 (2013.01); F01D 25/16 (2013.01); F05D 2260/98 (2013.01)

(58) Field of Classification Search
CPC ...... F01D 25/18; F01D 25/16; F05D 2260/98; F05D 2300/431; F05D 2300/501; F01M 11/0004; F16N 2210/02; F02C 7/06
USPC ........................................... 415/110
See application file for complete search history.

(56) References Cited

U.S. PATENT DOCUMENTS 5,911,678 A * 6/1999 White ................. F01D 25/18
60/39.08
2008/0072568 A1 3/2008 Moniz et al.
2017/0314471 A1 11/2017 Sennoun
2020/0025033 A1 1/2020 White et al.
2021/0164357 A1* 6/2021 Felske .................. F01D 9/041
2021/0181009 A1* 6/2021 Gebhard ................ G01F 23/68

FOREIGN PATENT DOCUMENTS

JP 2008-082335 A 4/2008
JP 2014-163236 A 9/2014
JP 2017-198204 A 11/2017

OTHER PUBLICATIONS

International Search Report for PCT/JP2021/005256 dated Mar. 30, 2021 [PCT/ISA/210].

* cited by examiner

Primary Examiner — Yi-Kai Wang
(74) Attorney, Agent, or Firm — Sughrue Mion, PLLC

(57) ABSTRACT

A gas turbine engine according to one aspect of the present invention includes: an oil tank storing lubricating oil; and a cylindrical external case accommodating a compressor, a combustor, and a turbine. The oil tank is arranged along an outer peripheral surface of the external case so as to surround the external case.

4 Claims, 2 Drawing Sheets

GAS TURBINE ENGINE

CROSS REFERENCE TO RELATED APPLICATIONS

This application is a National Stage of International Application No. PCT/JP2021/005256 filed Feb. 12, 2021, claiming priority based on Japanese Patent Application No. 2020-023236 filed Feb. 14, 2020, the entire contents of which are incorporated herein by reference.

TECHNICAL FIELD

The present disclosure relates to a gas turbine engine. The present invention relates to a gas turbine engine.

BACKGROUND ART

A gas turbine engine used as a power source of an aircraft or the like includes a cylindrical case (external case) accommodating a compressor, a combustor, and a turbine, and various accessories are attached around the external case (see PTL 1, for example).

CITATION LIST

Patent Literature

PTL 1: Japanese Laid-Open Patent Application Publication No. 2008-82335

SUMMARY OF INVENTION

Technical Problem

For example, it is desirable that to suppress air resistance when an aircraft gas turbine engine is mounted on an airframe, a frontal projected area of the gas turbine engine be made as small as possible, and the entire gas turbine engine including the accessories be reduced in diameter. However, according to current aircraft gas turbine engines, the accessories disposed on an outer peripheral surface of a casing are large. Therefore, the accessories largely project outward in a radial direction of the gas turbine engine, and this increases the frontal projected area of the gas turbine engine.

An object of the present disclosure is to provide a gas turbine engine that can be reduced in diameter.

Solution to Problem

A gas turbine engine according to one aspect of the present disclosure includes: an oil tank storing lubricating oil; and a cylindrical external case accommodating a compressor, a combustor, and a turbine. The oil tank is arranged along an outer peripheral surface of the external case so as to surround the external case.

According to this configuration, the oil tank can be prevented from largely projecting outward in a radial direction. Therefore, a frontal projected area of the gas turbine engine can be reduced, and the gas turbine engine can be reduced in diameter.

Advantageous Effects of Invention

The present disclosure can provide a gas turbine engine that can be reduced in diameter.

DESCRIPTION OF EMBODIMENTS

Figure 1:
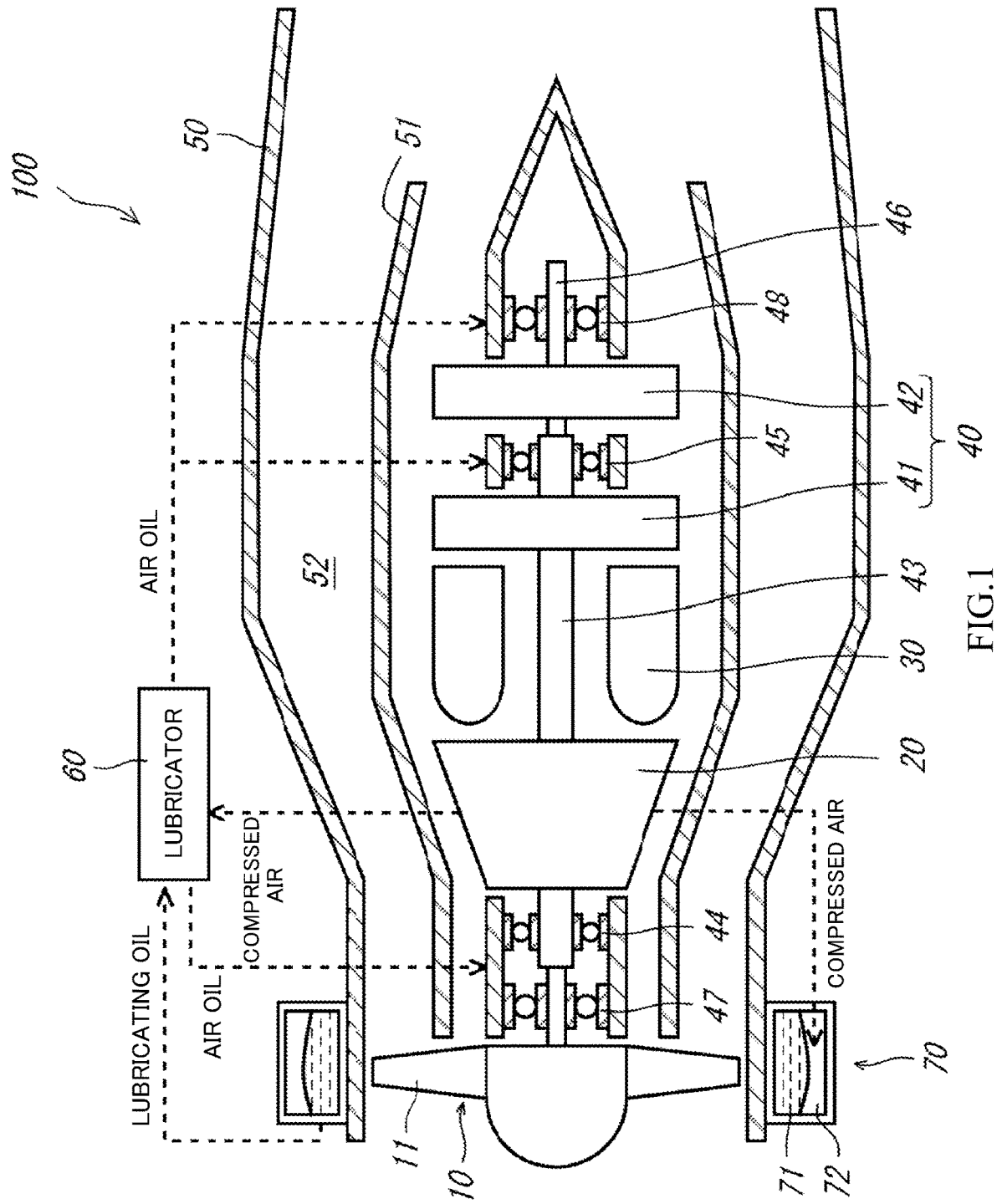
FIG. 1 is a schematic diagram of a gas turbine engine.

Hereinafter, a gas turbine engine (hereinafter simply referred to as an "engine") 100 according to an embodiment will be described. The engine 100 of the present embodiment is a two-shaft turbo fan engine for an aircraft. However, the type and use of the engine 100 are not especially limited. FIG. 1 is a schematic diagram of the engine 100. Hereinafter, a paper surface left side in FIG. 1 is referred to as a "front side," and a paper surface right side in FIG. 1 is referred to as a "rear side."

As shown in FIG. 1, the engine 100 according to the present embodiment includes a fan 10, a compressor 20, a combustor 30, a turbine 40, an external case 50, a lubricator 60, and an oil tank 70. Hereinafter, these components will be described in order.

The fan 10 includes fan blades 11. The fan 10 rotates to take in air and supplies the air to the compressor 20 and a bypass passage 52 located outside the compressor 20 in a radial direction. If the fan blade 11 breaks, part of the fan blade 11 may go through the external case 50 and scatter to an outside of the engine 100. Therefore, the engine 100 needs to be subjected to an antiscattering measure (containment measure) of the fan blades 11. The antiscattering measure of the fan blades 11 will be described later.

The compressor 20 is a component that compresses the air flowing therein from the fan 10. The compressor 20 may be: an axial compressor that compresses air which has been taken in from the front side, and supplies the air to the rear side, and supplies the air to the rear side; a centrifugal compressor that compresses air which has been taken in from the front side, and supplies the air outward in the radial direction; or a combination thereof. The air compressed by the compressor 20 is supplied to the combustor 30 located downstream of the compressor 20.

The combustor 30 is a component that sprays a fuel to the air compressed by the compressor 20 and combusts them. The fuel used in the engine 100 is not especially limited, and the type of the combustor 30 is not especially limited. In the combustor 30, a high-temperature and high-pressure combustion gas is generated by combusting the fuel. The combustion gas is supplied to the turbine 40 located downstream of the combustor 30.

The turbine 40 is a component that is rotated by energy of the combustion gas generated by the combustor 30. The turbine 40 may be: an axial turbine into which the combustion gas flows from the front side and through which the combustion gas flows to the rear side; a centrifugal turbine into which the combustion gas flows from the front side and through which the combustion gas flows outward in the radial direction; or a combination thereof. The turbine 40 of the present embodiment includes a high-pressure turbine 41 and a low-pressure turbine 42.

The high-pressure turbine 41 is coupled to the compressor 20 through an external shaft 43. Therefore, when the high-pressure turbine 41 is rotated by the combustion gas, this rotates the compressor 20. The external shaft 43 is supported by a first bearing 44 and a second bearing 45 so as to be rotatable.

The low-pressure turbine 42 is coupled to the fan 10 through an internal shaft 46. Therefore, when the low-pressure turbine 42 is rotated by the combustion gas, this rotates the fan 10. The internal shaft 46 penetrates an inside of the external shaft 43 and rotates independently from the external shaft 43. The internal shaft 46 is supported by a third bearing 47 and a fourth bearing 48 so as to be rotatable.

The external case 50 is a cylindrical case accommodating the fan 10, the compressor 20, the combustor 30, and the turbine 40. A cylindrical internal case 51 is disposed inside the external case 50 and has a center axis that coincides with a center axis of the external case 50. Among the fan 10, the compressor 20, the combustor 30, and the turbine 40, the internal case 51 accommodates the components other than the fan 10. The annular bypass passage 52 through which the air taken in by the fan 10 flows is formed between the external case 50 and the internal case 51.

The lubricator 60 is a device that supplies lubricating oil to lubrication targets. The lubricator 60 of the present embodiment is a non-circulation lubricator and ejects air oil or oil mist, prepared by mixing the compressed air extracted from the compressor 20 and the lubricating oil, to the first bearing 44, the second bearing 45, the third bearing 47, and the fourth bearing 48 that are the lubrication targets. However, the lubricator 60 may be a circulation lubricator that collects and reuses the used lubricating oil.

The oil tank 70 is a component that stores the lubricating oil. The oil tank 70 is disposed on an outer peripheral surface of the external case 50 and is arranged at an axial position corresponding to the fan 10. To be specific, the axial position of the oil tank 70 overlaps the axial position of the fan 10. In the present embodiment, an entire axial range of the fan 10 (i.e., a range from a front end to a rear end in the axial direction) is contained within an axial range of the oil tank 70. However, part of the axial range of the fan 10 may overlap the axial range of the oil tank 70.

As above, the oil tank 70 of the present embodiment is arranged at the axial position corresponding to the fan 10. Therefore, when the fan blade 11 breaks, the oil tank 70 can block the scattering fan blade 11. To be specific, in the engine 100 according to the present embodiment, the oil tank 70 is arranged at the axial position corresponding to the fan 10 in order to prevent the fan blades 11 from flying to an outside of the external case 50. As a result, a containment ring that is generally used for antiscattering of the fan blades 11 can be omitted. Therefore, the engine 100 can be reduced in weight while securing a containment property.

Figure 2:
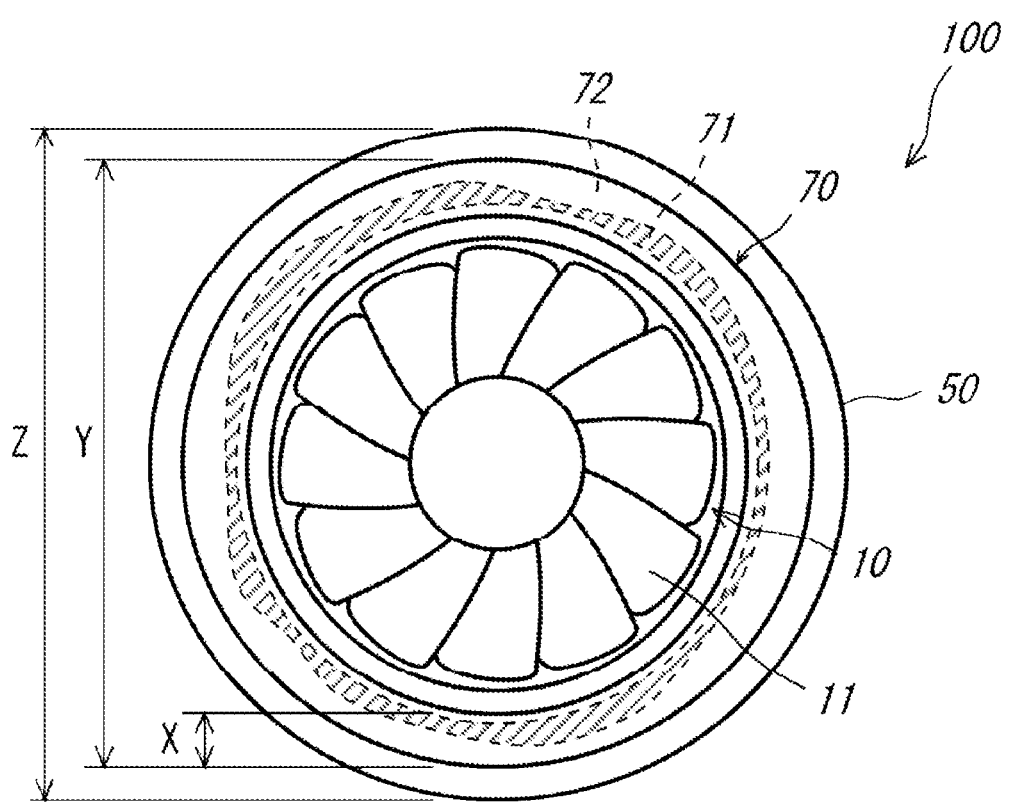
FIG. 2 is a schematic front view of the gas turbine engine.

FIG. 2 is a schematic front view of the engine 100. As shown in FIG. 2, the oil tank 70 is arranged along the outer peripheral surface of the external case 50 so as to surround the external case 50. Since the oil tank 70 is arranged as above, the oil tank 70 can be prevented from largely projecting outward in the radial direction when viewed from a front side of the engine 100 (when viewed in the axial direction). As a result, the engine 100 can be reduced in diameter. The above effect can be obtained if the oil tank 70 is arranged in a region that has an angle of, for example, 180 degrees or more in a circumferential direction of the external case 50.

In the present embodiment, the oil tank 70 is arranged in an annular shape over an entire circumference of the external case 50 in the circumferential direction. Since the oil tank 70 is arranged as above, the fan blades 11 can be surely prevented from scattering. In the present embodiment, the oil tank 70 is formed integrally. However, the oil tank 70 may be formed by coupling circular-arc tanks in the circumferential direction.

A radial thickness X of the oil tank 70 when viewed in the axial direction is constant in the circumferential direction. To be specific, when viewed in the axial direction, the radial thickness X of the oil tank 70 is constant regardless of circumferential positions. As above, since the radial thickness X of the oil tank 70 when viewed in the axial direction is constant in the circumferential direction, the oil tank 70 does not largely project in the radial direction, and therefore, the engine 100 can be further reduced in diameter.

Moreover, in the present embodiment, an outer diameter Y of the oil tank 70 is smaller than a largest outer diameter Z of the external case 50. To be specific, when viewed in the axial direction, the entire oil tank 70 is contained within a range (hereinafter referred to as a "projected range") defined by an outer edge of the external case 50. Moreover, in the present embodiment, when viewed in the axial direction, the lubricator 60 is also contained within the projected range of the external case 50. When viewed in the axial direction, both of the oil tank 70 and the lubricator 60 do not have to be contained within the projected range of the external case 50. If one or both of the oil tank 70 and the lubricator 60 are contained within the projected range of the external case 50, the engine 100 can be further reduced in diameter. When the external case 50 includes a flange and the like, the projected range is a range defined by the outer edge of the entire external case 50 including the flange and the like.

The oil tank 70 is a sealed expansion tank including a liquid chamber 71 and an air chamber 72. The lubricating oil is sealed in the liquid chamber 71, and the liquid chamber 71 is expandable and contractable. The air chamber 72 is adjacent to the liquid chamber 71. More specifically, the oil tank 70 is a bladder tank in which the liquid chamber 71 is made of rubber and has a bag shape. However, the oil tank 70 may be a diaphragm tank including an inside that is divided by a diaphragm into the liquid chamber 71 and the air chamber 72.

In the present embodiment, the compressed air extracted from the compressor 20 is supplied to the air chamber 72 of the oil tank 70. With this, the pressure in the air chamber 72 increases, and the volume of the liquid chamber 71 decreases. Thus, the lubricating oil in the liquid chamber 71 is discharged. A discharge port of the oil tank 70 may be located at any circumferential position. Moreover, the oil tank 70 may include one discharge port or may include plural discharge ports.

For example, if the oil tank 70 is a simple container, includes the discharge port in the vicinity of a bottom surface thereof, and is turned upside down since the posture of the engine 100 significantly changes, the lubricating oil cannot be discharged from the oil tank 70. However, according to the present embodiment, since the oil tank 70 is the sealed expansion tank, the lubricating oil can be discharged regardless of the posture of the engine 100.

Moreover, the liquid chamber 71 of the oil tank 70 has an annular shape in the oil tank 70. Therefore, even when a remaining amount of lubricating oil in the liquid chamber 71 decreases, the shape of the liquid chamber 71 is easily maintained. As a result, the lubricating oil in the liquid chamber 71 can be discharged completely. Furthermore, each of the liquid chamber 71 and the air chamber 72 according to the present embodiment is formed by a single chamber. However, the liquid chamber 71 may be formed by plural chambers that are independent from each other, and the air chamber 72 may be formed by plural chambers that are independent from each other.

As above, a gas turbine engine according to the present embodiment includes: an oil tank storing lubricating oil; and a cylindrical external case accommodating a compressor, a combustor, and a turbine. The oil tank is arranged along an outer peripheral surface of the external case so as to surround the external case.

Since the gas turbine engine according to the present embodiment is configured as above, the oil tank can be prevented from largely projecting outward in a radial direction. As a result, the gas turbine engine can be reduced in diameter.

Moreover, in the gas turbine engine according to the present embodiment, the oil tank is arranged over an entire circumference of the external case in a circumferential direction of the external case.

Since the gas turbine engine according to the present embodiment is configured as above, a projection amount of the oil tank in the radial direction can be reduced with respect to a necessary amount of lubricating oil. Moreover, when a turbine blade is provided, the scattering of the turbine blade can be surely prevented.

Moreover, the gas turbine engine according to the present embodiment includes a fan that includes fan blades and is accommodated in the external case. The oil tank is arranged at an axial position corresponding to the fan.

Since the gas turbine engine according to the present embodiment is configured as above, a containment ring for antiscattering of the fan blades can be omitted. As a result, the gas turbine engine can be reduced in weight while securing a containment property.

Moreover, in the gas turbine engine according to the present embodiment, the oil tank includes therein: a liquid chamber in which the lubricating oil is sealed, the liquid chamber being expandable and contractable; and an air chamber adjacent to the liquid chamber. When pressure in the air chamber increases, a volume of the liquid chamber decreases, and the lubricating oil in the liquid chamber is discharged.

Since the gas turbine engine according to the present embodiment is configured as above, the lubricating oil can be discharged regardless of the posture of the gas turbine engine.

Moreover, in the gas turbine engine according to the present embodiment, the liquid chamber has an annular shape in the oil tank.

The gas turbine engine according to the present embodiment is configured as above. Therefore, even when a remaining amount of lubricating oil in the liquid chamber decreases, the shape of the liquid chamber is easily maintained. As a result, the lubricating oil in the liquid chamber can be discharged completely.

The invention claimed is:

1. A gas turbine engine comprising:
   an oil tank storing lubricating oil;
   a cylindrical external case accommodating a compressor, a combustor, and a turbines; and
   a fan that includes fan blades and is accommodated in the external case, wherein;
   the oil tank is arranged along an outer peripheral surface of the external case so as to surround the external case and includes a portion whose axial position overlaps an axial position of the fan; and
   when viewed in an axial direction, at least a part of the oil tank is contained within a range defined by an outer edge of the external case.

2. The gas turbine engine according to claim 1, wherein the oil tank is arranged over an entire circumference of the external case in a circumferential direction of the external case.

3. The gas turbine engine according to claim 1, wherein:
   the oil tank includes therein
      a liquid chamber in which the lubricating oil is sealed, the liquid chamber being expandable and contractable and
      an air chamber adjacent to the liquid chamber; and
   when pressure in the air chamber increases, a volume of the liquid chamber decreases, and the lubricating oil in the liquid chamber is discharged.

4. The gas turbine engine according to claim 3, wherein the liquid chamber has an annular shape in the oil tank.

* * * * *